United States Patent [19]
Bose et al.

[11] Patent Number: 5,158,229
[45] Date of Patent: Oct. 27, 1992

[54] LOW TEMPERATURE, HIGH STRENGTH, NICKEL, BASE BRAZING ALLOYS

[75] Inventors: Debasis Bose, Piscataway, N.J.; Amitava Datta, East Greenwich, R.I.

[73] Assignee: Allied-Signal Inc., Morris Township, Morris County, N.J.

[21] Appl. No.: 826,286

[22] Filed: Jan. 24, 1992

Related U.S. Application Data

[60] Continuation of Ser. No. 455,649, Dec. 22, 1989, abandoned, which is a division of Ser. No. 325,065, Mar. 14, 1989, abandoned, which is a continuation of Ser. No. 765,081, Aug. 13, 1985, abandoned.

[51] Int. Cl.$^5$ .............................................. B23K 35/22
[52] U.S. Cl. ................................. 228/263.13; 228/238
[58] Field of Search ....................... 228/263.13, 263.15

[56] References Cited

U.S. PATENT DOCUMENTS

| | | | |
|---|---|---|---|
| 3,856,513 | 12/1974 | Chen et al. ............................ | 75/122 |
| 4,148,973 | 4/1979 | Sexton et al. .............. | 228/263.15 X |
| 4,302,515 | 11/1981 | De Cristofaro et al. ........... | 428/680 |
| 4,314,661 | 2/1982 | De Cristofaro et al. ... | 228/263.15 X |
| 4,515,869 | 5/1985 | Bose et al. ............................ | 428/656 |
| 4,543,135 | 9/1985 | Bose et al. ...................... | 428/680 X |
| 4,658,537 | 4/1987 | Bose et al. ....................... | 228/263.15 |
| 4,745,037 | 5/1988 | De Cristofaro et al. ........... | 428/678 |

*Primary Examiner*—Richard K. Seidel
*Assistant Examiner*—Patty E. Hong
*Attorney, Agent, or Firm*—Gus T. Hampilos; Gerhard H. Fuchs; Ernest D. Buff

[57] ABSTRACT

Brazing of metal parts employing a low temperature, high strength metal alloy is disclosed. The alloy has a composition consisting essentially of about 6.10 to 6.66 atom percent chromium, about 2.43 to 2.46 atom percent iron, about 10.06 to 25.10 atom percent boron, about 3.22 to 12.85 atom percent silicon and the balance essentially nickel and incidental impurities, the composition being such that the total of nickel, chromium and iron ranges from about 71.68 to 74.58 atom percent and the total of boron and silicon ranges from about 25.42 to 28.32 atom percent. Such an alloy is suitable for brazing $\gamma'$ superalloys and stainless steels at temperatures ranging from about 927°–1010° C. to provide strong, low cost joints.

4 Claims, 1 Drawing Sheet

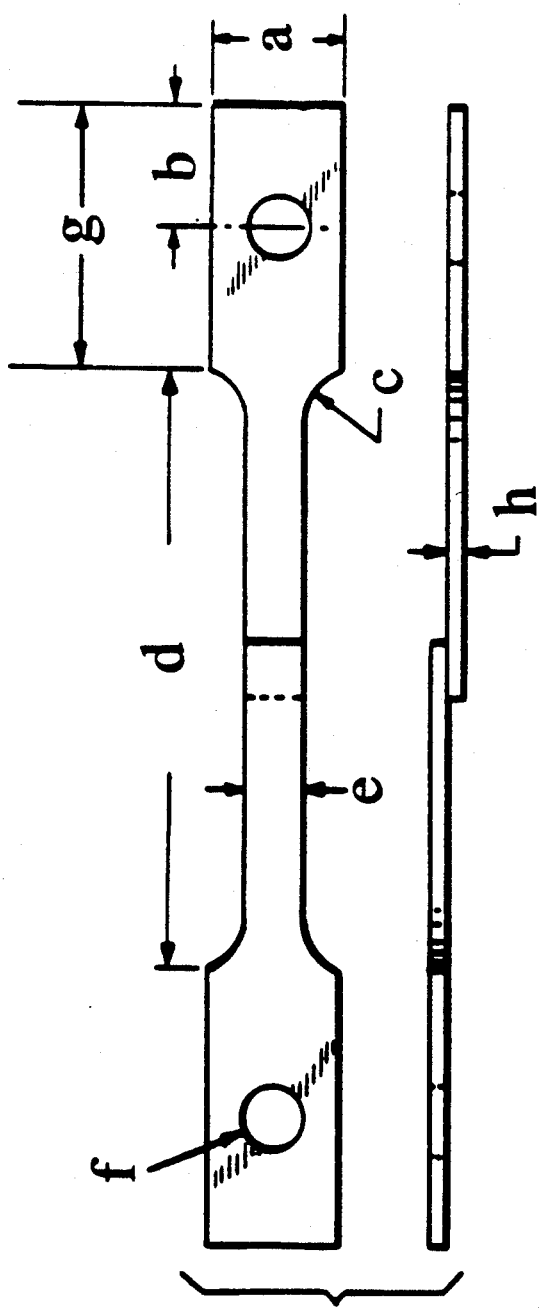
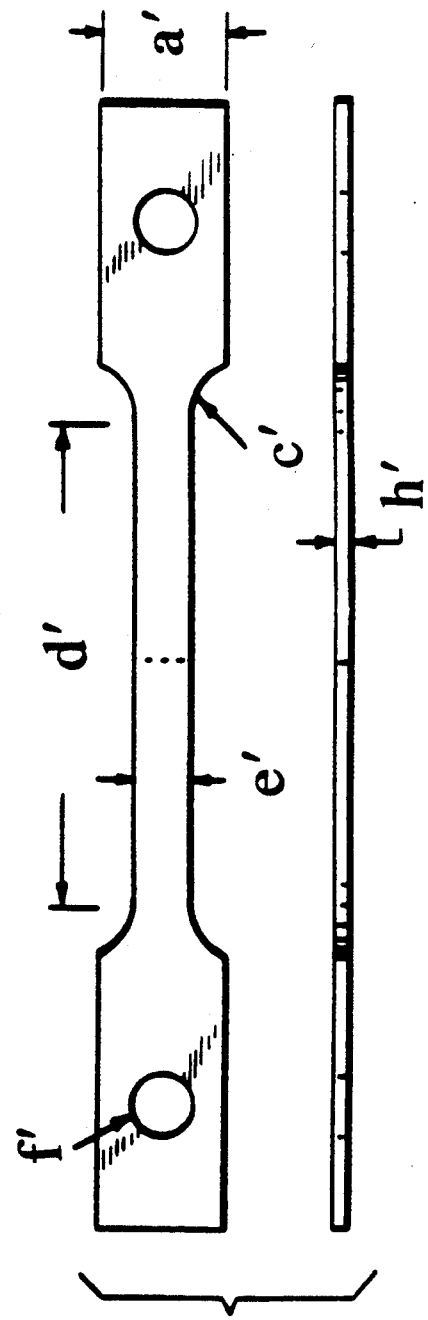
FIG. 1
FIG. 2

LOW TEMPERATURE, HIGH STRENGTH, NICKEL, BASE BRAZING ALLOYS

This application is a continuation of application Ser. No. 07/455,649 fled Dec. 12, 1989, now abandoned; which is a division of 07/325,065 filed Mar. 14, 1989, now abandoned; which is a continuation of 06/765,081 filed Aug. 13, 1985, now abandoned.

BACKGROUND OF THE INVENTION

1. Field of the Invention

This invention relates to brazing of metal parts, and in particular, to a homogeneous, ductile brazing material useful in brazing stainless steels and superalloys.

2. Description of the Prior Art

Brazing is a process for joining metal parts, often of dissimilar composition, to each other. Typically, a filler metal that has a melting point lower than that of the base metal parts to be joined together is interposed between the metal parts to form an assembly. The assembly is then heated to a temperature sufficient to melt the filler metal. Upon cooling, a strong, corrosion resistant, leak-tight joint is formed.

Quite often the brazed assemblies are heat treated (or solution treated) after brazing. Alternatively, heat treatment or solution treatment of the base metal and brazing can be performed simultaneously. Heat treatment (or solution treatment) is a procedure that comprises heating the metal part to a preselected temperature followed by cooling at a preselected rate to achieve desired mechanical properties of the base metal. Solution treatment, frequently applied to strengthen superalloys, consists of several heating and cooling cycles. Some $\gamma'$ [$Ni_3(Al,Ti)$]hardened superalloys (e.g., Inconel 718) require solution treatment below 1010° C. (1850° F.) to prevent excessive grain growth and dissolution of $\gamma'$, resulting in reduced mechanical properties.

The most widely used brazing filler metal for joining superalloys such as Inconel 718 is a gold-nickel alloy (designated by the American Welding Society as BAu-4) consisting of 57.6 atom percent gold and 42.4 atom percent nickel (82 weight percent gold and 18 weight percent nickel). Brazing temperatures employed for this gold-nickel filler metal are in the vicinity of 996° C. (1825° F.), and joints formed using such filler metal provide good strength and corrosion resistance at elevated temperatures. The main drawback of this filler metal is its precious metal content, and hence its high price. For this reason, fabricators using $\gamma'$ superalloys have long been on the look out for less expensive substitutes. Certain of the brazing alloys designed in the AWS BNi family provide mechanical and metallurgical properties that are comparable to those of gold-nickel filler metal. However, the brazing temperatures of these BNi alloys are greater than 1010° C. (1850° F.). As a result, such BNi alloys are not suitable for joining $\gamma'$ superalloys.

Ductile glassy metal alloys have been disclosed in U.S. Pat. No. 3,856,513 issued Dec. 24, 1974 to H.S. Chen et al. These alloys include compositions having the formula $M_aY_bZ_c$, where M is a metal selected from the group consisting of iron, nickel, cobalt, vanadium and chromium, Y is an element selected from the group consisting of phosphorus, boron and carbon, and Z is an element selected from the group consisting of aluminum, silicon, tin, germanium, indium, antimony and beryllium, "a" ranges from about 60 to 90 atom percent, "b" ranges from about 10 to 30 atom percent and "c" ranges from about 0.1 to 15 atom percent. Also disclosed are glassy wires having the formula $T_iX_j$ where T is a transition metal or mixture thereof and X is an element selected from the group consisting of aluminum, antimony, beryllium, boron, germanium, carbon, indium, phosphorous, silicon and tin and mixtures thereof and where the proportion in atomic percentages by i and j are respectively from about 70 to about 87 and from about 13 to about 30, with the proviso that i plus j equals 100. The transition metals T are those of Group IB, IIIB, IVB, VB, VIs, BIIV and VIII of the Periodic Chart of the Elements and include the following: scandium, yitrium, lanthanum, actinium, titanium, zirconium, hafnium, vanadium, niobium, tantalum, chromium, molybdenum, thenium, osmium, cobalt, rhodium, iridum, nickel, palladium, platinum, copper, silver, and gold; preferably, Fe, Ni, Co, V, Cr, Pd, Pt and Ti.

There remains a need in the art for an inexpensive brazing alloy in homogeneous foil or powder form, the mechanical and metallurgical properties of which would be comparable to those of the aforesaid BAu-4 alloy.

SUMMARY OF THE INVENTION

The present invention provides a metal alloy which is suitable for joining $\gamma'$ superalloys at temperatures ranging from about 1700°–1850° F. (926°–1010° C.) but which is much less expensive than alloys such as BAu-4 previously used. Generally stated, the alloy consists essentially of about 6.10 to 6.66 atom percent chromium, about 2.43 to about 2.66 atom percent iron, about 10.06 to 25.10 atom percent boron, about 3.22 to 12.85 atom percent silicon, and the balance essentially nickel and incidental impurities, the composition being such that the total of nickel, chromium and iron ranges from about 71.68 to 77.68 atom percent and the total of boron and silicon ranges from about 22.32 to 28.32 atom percent.

In addition, the invention provides a process for joining together two or more metal parts comprising the steps of:

(a) interposing a filler metal between the metal parts to form an assembly, the filler metal having a melting temperature less than that of any of the metal parts;

(b) heating the assembly to at least the melting temperature of the filler metal; and (c) cooling the assembly, wherein the improvement comprises employing at least one homogeneous, ductile filler metal foil having a composition consisting essentially of about 6.10 to 6.66 atom percent chromium, about 2.43 to about 2.66 atom percent iron, about 10.06 to 25.10 atom percent boron, about 3.22 to 12.85 atom percent silicon, the balance being essentially nickel and incidental impurities, the composition being such that the total of nickel, chromium and iron ranges from about 71.68 to 77.68 atom percent and the total of boron and silicon ranges from about 22.32 to 28.32 atom percent.

The principal objective of the present invention is to provide brazing alloys having brazing temperatures below 1010° C. (1850° F.) and which do not contain noble metals. In addition, the mechanical properties of brazements made with compositions selected from these alloys are comparable to these made with BAu-4 filler metal. Since the alloys of the present invention contain substantial amounts of boron (10.06 to 25.10 atom percent) and silicon (3.22 to 12.85 atom percent), which are present in the solid state as hard and brittle borides and silicides, the preferred method for fabrication of these alloys into a flexible thin foil form is that of rapid solidification on a moving chill surface. Foil produced in this manner is composed of metastable material having at least 50% glassy structure with a thickness of less than 76 μm (.003"). Other methods, such as (1) rolling (2) casting or (3) powder metallurgical techniques can be applied to fabricate these alloys to a foil form. It has been found that use of a thin flexible and homogeneous foil, is beneficial for joining wide areas with narrow clearances. The alloys of the invention can also be produced in powder form by atomization of the alloy or mechanical communication of a foil composed thereof.

BRIEF DESCRIPTION OF THE DRAWINGS

The invention will be more fully understood and further advantages will become apparent when reference is made to the following detailed description of the preferred embodiment of the invention and the accompanying drawings, in which:

FIG. 1 is a combined plan and elevation of a machined tensile test specimen brazed with an alloy of the present specimen; and FIG. 2 is a combined plan and elevation of a stress rupture test specimen brazed with an alloy of the present invention.

DETAILED DESCRIPTION OF THE INVENTION

In any brazing process, the brazing material must have a melting point that will be sufficiently high to provide strength to meet service requirements of the metal parts brazed together. However, the melting point must not be so high to make the brazing operation difficult. Further, the filler material must be compatible, both chemically and metallurgically, with the materials being brazed. The brazing material must be more noble than the metal being brazed to avoid corrosion. Ideally, the brazing material must be in ductile foil form so that complex shapes may be stamped therefrom. Finally, the brazing foil should be homogeneous, that is, contain no binders or other materials that would otherwise form voids or contaminating residues during brazing.

In accordance with the invention, a homogeneous ductile brazing material in foil form is provided. The brazing foil is less than 76 μm (0.003") preferably about 38 μm (0.0015") to 63.5 μm (0.0025") thick and most preferably about 12.7 μm (0.0005") to 38 μm (0.0015") thick. Preferably the brazing foil has a composition consisting essentially of about 6.10 to 6.66 atom percent chromium, about 2.43 to 2.66 atom percent iron, about 10.06 to 25.10 atom percent boron and about 3.22 to 12.85 atom percent silicon, the balance being essentially nickel and incidental impurities. The composition is such that the total of nickel, chromium and iron ranges from about 71.68 to 77.68 atom percent and the total of boron and silicon comprises the balance, that is, about 22.32 to 28.32 atom percent. These compositions are compatible with all stainless steels, as well as nickel and cobalt based alloys.

By homogeneous is meant that the foil, as produced, is of substantially uniform composition in all dimensions. By ductile is meant that the foil can be bent to a round radius as small as ten times the foil thickness without fracture.

Examples of brazing alloy compositions within the scope of the invention are set forth in Table I below:

TABLE I

| Example No. | Ni | Cr | B | Si | Fe |
|---|---|---|---|---|---|
| 1 (wt %) | 82 | 7 | 6 | 2 | 3 |
| (at %) | 63.15 | 6.10 | 25.10 | 3.22 | 2.43 |
| 2 (wt %) | 82 | 7 | 5 | 3 | 3 |
| (at %) | 64.83 | 6.25 | 21.47 | 4.96 | 2.49 |
| 3 (wt %) | 80.5 | 7 | 2.2 | 7.3 | 3 |
| (at %) | 67.77 | 6.66 | 10.06 | 12.85 | 2.66 |
| 4 (wt %) | 83 | 7 | 3 | 4 | 3 |
| (at %) | 69.92 | 6.66 | 13.72 | 7.04 | 2.66 |
| 5 (wt %) | 82 | 7 | 3 | 5 | 3 |
| (at %) | 68.45 | 6.60 | 13.60 | 8.72 | 2.63 |
| 6 (wt %) | 81 | 7 | 3 | 6 | 3 |
| (at %) | 67.00 | 6.54 | 13.48 | 10.37 | 2.61 |
| 7 (wt %) | 80.5 | 7 | 3 | 6.5 | 3 |
| (at %) | 66.28 | 6.51 | 13.42 | 11.19 | 2.60 |
| 8 (wt %) | 81.5 | 7 | 4.5 | 4 | 3 |
| (at %) | 65.01 | 6.30 | 19.50 | 6.67 | 2.52 |
| 9 (wt %) | 82.7 | 7 | 5 | 2.3 | 3 |
| (at %) | 65.78 | 6.29 | 21.60 | 3.82 | 2.51 |

The brazing temperature of some of the brazing alloys of the invention are below 1010° C. (1850° F.). The temperature of brazing is thus in the solution treatment range of γ' superalloys. This will also enable fabricators to braze and heat treat γ' superalloys simultaneously.

The brazing foils of the invention are prepared by cooling a melt of the desired composition at a rate of at least about 10$^5$° C./sec, employing metal alloy quenching techniques well-known to the glassy metal alloy art; see, e.g., U.S. Pat. Nos. 3,856,513 and 4,148,973 discussed earlier. The purity of all compositions is that found in normal commercial practice.

A variety of techniques are available for fabricating continuous ribbon, wire, sheet, etc. Typically, a particular composition is selected, powders or granules of the requisite elements in the desired portions are melted and homogenized, and the molten alloy is rapidly quenched on a chill surface, such as rapidly rotating metal cylinder.

Under these quenching conditions, a metastable, homogeneous, ductile material is obtained. The metastable material may be glassy, in which case there is no long range order. X-ray diffraction patterns of glassy metal alloys show only a diffuse halo, similar to that observed for inorganic oxide glasses. Such glassy alloys must be at least 50% glassy to be sufficiently ductile to permit subsequent handling, such as stamping complex shapes from ribbons of the alloys. Preferably, the glassy metal alloys must be at least 80% glassy, and most preferably substantially (or totally) glassy, to attain superior ductility.

The metastable phase may also be a solid solution of the constituent elements. In the case of the alloys of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some burdening of the peaks due to desired fine-grained size of crystallites. Such metastable materials are also ductile when produced under the conditions described above.

The brazing material of the invention is advantageously produced in foil (or ribbon) form, and may be used in brazing applications as cast, whether the material is glassy or a solid solution. Alternatively, foils of glassy metal alloys may be heat treated to obtain a crystalline phase, preferably fine-grained, in order to promote longer die life when stamping of complex shapes is contemplated.

Foils as produced by the processing described above typically are about 13 μm (0.0005) to 76 μm (0.003) inch thick, which is also the desired spacing between bodies being brazed. Foil thickness, and hence spacing of about 13 μm (0.005) to 36 μm (0.0014) inch maximizes the strength of the braze joint. Thinner foils stacked to form a thickness of greater than 0.0025 inch may also be employed. Further, no fluxes are required during brazing, and no binders are present in the foil. Thus, formation of voids and contamination residues is eliminated. Consequently, the ductile brazing ribbons of the invention provide both ease of brazing by eliminating the need for spacers, and minimal post-brazing treatment.

EXAMPLE 1

Ribbons of about 2.54 to 25.4 mm (about 0.10 to 1.00 inch) wide and about 13 to 76 μm (about 0.0005 to 0.003 inch) thick were formed by squirting a melt of the particular composition by overpressure of argon onto a rapidly rotating copper chill wheel (surface speed about 3000 to 6000 ft/min.). Metastable homogeneous ribbons of substantially glassy alloys having the compositions set forth in Table 1 were produced.

EXAMPLE 2

The liquidus and solidus temperatures of the ribbons mentioned in Example 1 were determined by Differential Thermal Analysis (DTA) Technique. The individual samples were heated side by side with an inert reference material at a uniform rate and the temperature difference between them was measured as a function of temperature. The resulting curve, known as a thermogram, was a plot of heat-energy change vs. temperature, from which the beginning of melting and end of melting, known respectively as solidus and liquidus temperatures, were determined. Values thus determined are set forth in Table 11 below.

TABLE II

| Sample No. | Liquidus °C. | Solidus °C. |
| --- | --- | --- |
| 1 | 1100 | 978 |
| 2 | 1075 | 960 |
| 3 | 1030 | 961 |
| 4 | 1026 | 993 |
| 5 | 1008 | 963 |
| 6 | 993 | 960 |
| 7 | 997.5 | 960.5 |
| 8 | 1053 | 958 |
| 9 | 1067 | 993 |

EXAMPLE 3

Tensile test specimens of dimensions 2.54 cm×15.24 cm ×0.158 cm thick (1"×6"×0.0625") were cut from Inconel 718 superalloy. The brazing alloys of the invention, glassy ductile ribbons of nominal chemical compositions of samples 6 and 7 as in Table I having dimensions of about 38 μm (0.0015") thick by 6.35-12.7 mm (0.25-0.5") wide, were used to braze test specimens. Braze joints were of the lap type, with lap dimension carefully controlled to 3.175 mm (0.125"). Brazing specimens were decreased in acetone and rinsed with alcohol. Lap joints containing brazing ribbons of the invention were assembled by laying ribbons side by side to cover the entire length of the lap joint. In the case of these brazing alloys, ribbons acted as joint spacers. Specimens were then tack welded by gas tungsten arc welding to hold the assembly together.

For comparative purposes, samples were made in an identical manner to that described above using 38 μm (0.0015") thick×2.54 cm (1") wide BAu-4 foil.

Brazing was done in a vacuum furnace at a vacuum of about $10^{-4}$ torr for about 5 minutes. Brazing temperatures of the alloys of the invention were about 25° C. (50° F.) higher than the liquidus temperature of each alloy as given in Table Il. Each of the BAu-4 samples was brazed at 996° C. (1825° F.). After brazing, the specimens were machined to produce a specimen as shown in FIG. 1 having the following under dimensions:

a±1.050" (2.667 cm); b=0.812"±.005" (2.072 cm±.0127); c=0.375R"(0.953R cm) where R is the radius of the arc; d=2.25"±.010 (5.715 cm±.0254; e−0.5" (1.27 cm); f=0.375R"±.003/−0.000, where R is the radius o the hole; g=2b±0.0625"(0.158 cm); and, h=0.0625" (0.158 cm).

Machined specimens were then solution treated in the following way to achieve optimum strength of the base metal: 980° C. (1800° F.)/1 hr/air cool +720° C. (1325° F.)/8 hr/furnace cool and 620° C. (1150° F.)/8 hr/air cool to a base metal hardness of Rc 38-41.

Tensile tests were conducted at 538° C.±5° C. (1000° F. ±10° F.) since superalloys such as lnconel 718 are usually in service at elevated temperatures. The test results are reported in Table III.

TABLE III

| Sample No. | Shear Stress MPa (psi) | Tensile Stress MPa (psi) | Area of Failure |
| --- | --- | --- | --- |
| 6 | 362 (52,560) | 725 (105,170) | Base Metal |
| 7 | 352 (51,040) | 703 (102,080) | Base Metal |
| BAu-4 | 337 (48,813) | 687 (99,627) | Joint |

At an overlap of 0.3175 cm 0.125"), all the brazed samples made with the alloys of the invention failed in the base metal, indicating that the strength of the brazed joint was greater than that of the base metal. In other words, the base metal failed before the brazed joint. By way of contrast, each of the BAu-4 brazements failed in the brazed joint. This data indicates that joints constructed with an overlap of 0.317cm (0.125") and then brazed with the alloys of invention were stronger than joints having the aforesaid construction that were brazed with the BAu-4 alloy.

EXAMPLE 4

The joint stress rupture strength of some of the alloys of the present invention were determined in the following way. Test specimens of dimensions 2.5 cm×15.24 cm×0.158 cm thick (1"×6"×0.0625") were cut from Inconel-718 superalloy. The brazing alloys of the invention, glassy ductile ribbons of nominal chemical compositions of samples 6 and 7 as in Table I having dimensions of about 38 μm (0.0015") thick by 6.35-12.7 mm (0.25-0.5") wide, were used to braze test specimens. Braze joints were of the butt type where the bonding area was equal to the cross-section of the test specimens.

Brazing specimens were decreased in acetone and rinsed in alcohol. The selected brazing foils of the present invention were then placed between the mating cross-sections of the test specimens and the assemblies were lightly tack welded. As a result, after brazing, a clearance between the blanks was maintained which was the thickness of the particular brazing foil. Brazing was performed in a similar way to that described in Example 3. After brazing the specimens were machined to produce a specimen as shown in FIG. 2 having the following dimensions:

a'=1.05" (2.667 cm); c' =0.375R" (0.953R cm); d'=2.250" (5.715 cm); e'=0.5" (1.27 cm); f=0.375R" (0.953R cm); and h'=0.0625" (0.158 cm). Machined specimens were then solution treated in the manner described in Example 3.

For comparative purposes, samples were made in an identical manner to that described above using 38 μm (0.0015") thick×2.54 cm (1") wide BAu-4 foil.

Stress rupture tests were conducted at 538° C.±5° C. (1000° F.±10° F.) at a static load of 455 kg (1000 lbs). The test results are reported in Table IV.

TABLE IV

| Alloy | Time of Failure (Hrs.) |
|---|---|
| Sample 6 | 49 |
| Sample 7 | 140 |
| BAu-4 | 1 |

It is evident from Table IV, that the joint rupture strength of the selected alloys of the present invention are much superior to that of the BAu-4 alloy.

We claim:
1. A process for joining together two or more metal parts at least one of which is composed of $\gamma'$ superalloy, comprising the steps of:
   (a) interposing a filler metal between the parts to form an assembly, the filler metal having a melting temperature less than that of any of the metal parts;
   (b) heating the assembly to at least the melting temperature of the filler metal; and
   (c) cooling the assembly, wherein the improvement comprises employing at least one homogeneous, ductile filler metal foil having a liquidus of between about 926° C. and about 1010° and a composition consisting of about 6.10 to 6.66 atom percent chromium, about 2.43 to 2.66 atom percent iron, about 10.06 to 25.10 atom percent borom, about 3.22 to 12.85 atom percent silicon the balance being nickel and incidental impurities, and the composition being such that the sum of nickel, chromium and iron ranges from about 71.68 to 77.68 atom percent and the sum of boron and silicon ranges from about 22.32 to 28.32 atom percent.

2. A process as recited in claim 1, wherein said foil is composed of metastable material having at least 50 percent glassy structure.

3. A process as recited in claim 2 wherein said foil has a thickness ranging from 0.0005 to 0.003 inch (about 13 to 76 μm).

4. A process as recited in claim 2, wherein said foil is at least about 80 percent glassy.

* * * * *